July 7, 1936.                    H. C. NYCUM                    2,046,696
                               REGULATING SYSTEM
                              Filed March 8, 1935
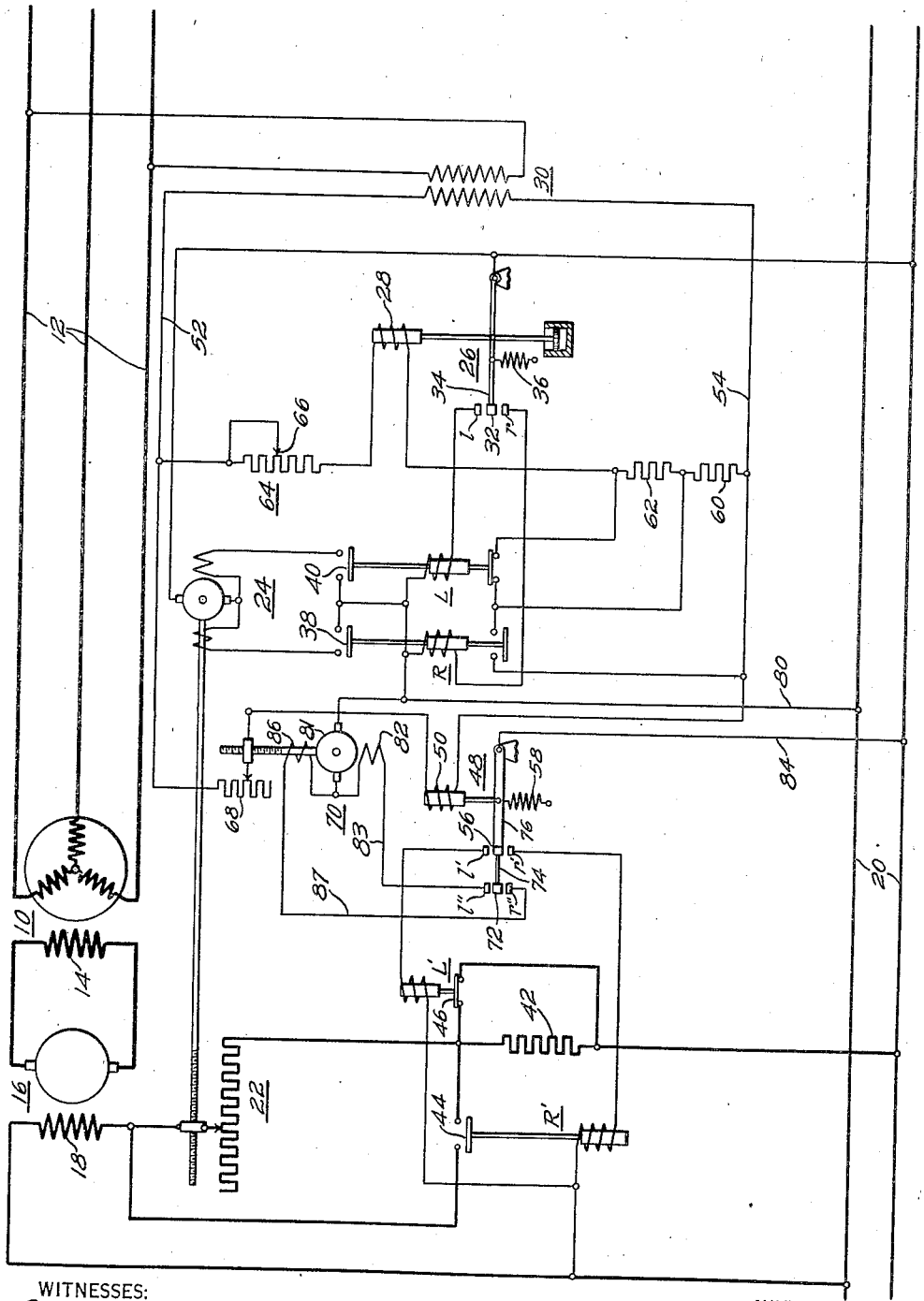
WITNESSES:                                                    INVENTOR
                                                         Homer C. Nycum.
                                                         BY
                                                                ATTORNEY Patented July 7, 1936

2,046,696

UNITED STATES PATENT OFFICE 2,046,696

REGULATING SYSTEM

Homer C. Nycum, Wilkinsburg, Pa., assignor to Westinghouse Electric & Manufacturing Company, East Pittsburgh, Pa., a corporation of Pennsylvania Application March 8, 1935, Serial No. 9,967

3 Claims. (Cl. 171—312)

My invention relates to electrical regulating systems, and it has particular relation to rheostatic type generator voltage regulators wherein a separate quick-acting contact-making device sensitive to large changes in the regulated voltage is utilized to control a pair of field-forcing contactors.

In systems of this and other equivalent classes, the mentioned field-forcing control equipment supplements the major contact-making voltmeter which by controlling the motor-operated rheostat effects normally-required corrective adjustments in the machine excitation. Both of these contact-making devices are energized by a measure of the regulated voltage or other quantity to be maintained constant.

The major or normal-voltage-controlling contact-making device is provided with a voltage-adjusting rheostat or other calibration-adjusting means connected in circuit with its actuating winding. In order to assure proper correlation between the quick-acting contact-making device and the one just referred to for differing settings of this calibration-adjustor, it is essential that the quick-acting device also be subjected to changes in its calibration which correspond to those of the normal device originally operated on.

Generally stated, the object of my invention is to provide means for automatically adjusting the calibration of the quick-response device in direct correspondence with calibration changes in the normal-response quantity-sensitive device.

Another object of my invention is to provide a system of this type which takes into account any difference in the characteristics of the two quantity-sensitive devices correlated and their calibration-adjusting means.

In practicing my invention, I connect in the energizing circuit of the quick-response device a calibration-adjusting rheostat adapted to be operated by a reversible motor. I then equip the movable member of this device with a resilient connection through which a set of auxiliary contact members, sensitive to relatively small changes in the regulated quantity, are actuated. By utilizing these contact members to control the operation of the calibration-adjusting motor before-mentioned, I am able at all times to maintain the calibration of the quick-response device in proper correlation with that of the normal change-response device throughout its entire range of calibration adjustment.

My invention itself, together with additional objects and advantages thereof, will best be understood through the following description of a specific embodiment, when taken in conjunction with the accompanying drawing, in which the single figure is a diagrammatic representation of apparatus and circuits showing the calibration correlating means of my invention applied to a rheostatic type of generator voltage regulator.

Referring to the drawing, the regulating system there depicted is adapted to maintain constant the voltage of an electrical generator 10, the armature windings of which are directly connected with the conductors of an output circuit 12, and the field winding 14 of which derives energy from the armature winding of a direct-current exciter 16. The field winding 18 of this exciter is shown as deriving its energization from a source of substantially constant direct-current potential represented by circuit conductors 20.

Adjustment of the current supplied to winding 18 is effected by a rheostat 22 which is equipped with a reversible operating motor 24, the energization of which, in the generator voltage raising and lowering directions, respectively, is controlled by a pair of relays R and L. Selective actuation of these two relays is effected by means of a contact-making voltmeter 26, the actuating winding 28 of which is energized by a measure of the voltage, supplied by the regulated generator 10 to circuit 12, through a connection which includes a transformer 30.

In operation of the basic regulating system thus far described, as long as the voltage of circuit 12 remains of the value desired, the movable contact member 32 of the device 26 occupies the neutral or mid-position illustrated, and neither relay R nor L is actuated. For such a condition, the upwardly acting magnetic pull exerted by winding 28 of device 26 upon the contact-carrying arm 34 just balances the opposing downward pull of a tension spring 36.

In the event that the voltage of circuit 12 falls below the desired value, spring 36 biases contact member 32 downwardly into engagement with a stationary member r, and thereby completes an actuating circuit for motor control relay R. This circuit, as do all of the remaining control circuits represented, receives energization from the control-source conductors 20. Thus actuated relay R biases its contact members upwardly, completing through member 38, an energizing circuit which causes rheostat operating motor 24 to run in a direction which decreases the resistance of rheostat 22 and by raising the current supplied to exciter field winding 18, effects a corrective adjustment in the voltage of regulated machine 10.

In a similar manner, in the event that the regulated voltage rises above the desired value, device 26 biases its contact member 32 upwardly into engagement with a stationary member 1. This completes an actuating circuit for motor control relay L which, in biasing its contact member 40 upwardly, completes a circuit from control source 20 for energizing motor 24 in a direction to raise the resistance of rheostat 22 to thereby correctively effect a lowering of the voltage of regulated machine 10.

In the majority of installations of such rheostatic voltage regulating systems, it is desirable to supplement the equiment just detailed, which in itself is capable of effecting the corrections in regulated quantity at a relatively slow rate only, by quick-response apparatus which comes into action only when the regulated quantity deviates from its desired value by a large amount. Such supplemental equipment conventionally may take the form of a pair of field-forcing relays R' and L', which when actuated, respectively short-circuit the rheostat 22 to effect a rapid increase in the current supplied to the exciter field winding 18, and interrupt a normally maintained shunt connection around a resistor 42, which causes the current supplied to the exciter field winding to rapidly decrease. The two actions just named are effected by means of contact members 44 and 46, respectively, associated with the two relays R' and L'.

To selectively control the actuation of these two relays, it is customary to provide a second contact-making device 48, the contacts of which close only upon predeterminedly large deviations in the voltage of regulated circuit 12. As shown, this device comprises an actuating winding 50 which is parallel-connected, between conductors 52 and 54 which comprise the output circuit of the regulated-voltage energized transformer 30, with winding 28 of the normally responsive element 26. A movable contact member 56 of device 48 is adapted to engage one or the other of the two cooperating stationary members r' and l' only when the voltage of regulated circuit 12 deviates by a large amount, such as 5% or more, from its desired value. The sensitivity of device 48 is thus much lower than that of the major contact-making device 26 which in a conventional installation may engage its contact members upon regulated quantity deviations no greater than ½ of 1%.

In operation of these quick-response quantity corrective means, when the voltage of regulated circuit 12, for example, drops below its desired value by the 5% or other predeterminedly large amount to which device 48 is sensitive, the tension spring 58 of this device overcomes the upwardly acting pull of the actuating winding 50 and thus biases contact member 56 downwardly into engagement with stationary member r'. This completes, from control source 20, an actuating circuit for excitation raising relay R' which, by biasing contact member 44 upwardly, then effects, in the manner before explained, a rapid rise in the voltage of regulated machine 10. As soon as the correction brings the voltage error below the value to which contact-making device 48 is sensitive, contact member 56 thereof disengages from member r' and by allowing relay R' to return to the unactuated position illustrated, restores control to the normally-responsive voltage sensitive device 26 and the motor-operated rheostat 22.

In a similar manner, in the event that the voltage of regulated circuit 12 rises above its desired value by, say, 5% or other predeterminedly large amount, device 48 biases its contact member 56 upwardly into engagement with stationary member l' to complete an actuating circuit for excitation-decreasing relay L'. In moving contact member 46 thereof upwardly, this relay inserts into the energizing circuit of exciter field winding 18 the resistor 42 which, as already explained, rapidly decreases the voltage of regulated machine 10. Contacts 56 and l' of device 48 reopen when this voltage again approaches the desired value, and thereby restores control to the basic contact-making device 26 and the motor-operated rheostat 22.

In order to prevent hunting of the contact-making device 26, it is usual to provide in the energizing circuit thereof a pair of resistors such as are shown at 60 and 62, which serve to sufficiently modify the calibration of the relay upon the respective actuation of motor control relays R and L as to effect a disengagement of the movable contact members 32 of device 26 slightly before the voltage of circuit 12 has, after a deviation, been completely brought back to the desired value.

In any regulating system, it is desirable to adjust the magnitude of the quantity being maintained constant either to match changing operating conditions, or for other reasons. In a system of the type disclosed, this adjustment is conveniently effected through the use of a rheostat 64 connected in the energizing circuit of the actuating winding 28 of the contact-making device. By changing the position along the resistor of the movable contact member 66, the value of the voltage of circuit 12, at which the movable contact member 32 of the device will occupy the mid or neutral position shown, may be varied throughout a substantial range. Thus, as the resistance of rheostat 64 is decreased, as by moving the adjusting contact 66 downwardly, a lower voltage of circuit 12 will suffice to maintain relay 26 in its neutral or contact-disengaged position. Similarly, as the resistance of the calibration-adjusting rheostat is increased, as by moving contact 66 upwardly, a higher voltage in the regulated circuit 12 is necessary to maintain the contact 32 in the illustrated disengaged position.

In order that the quick-response large change-sensitive device 48 may, at all times, properly correlate its operation with that of the basic contact-making device 26, it is essential, as before explained, that its calibration should, in a general way at least, be changed or adjusted in the same manner as is that of device 26. In accordance with my invention, I provide means for automatically accomplishing this function.

In the diagram, these means are illustrated as comprising a second calibrating-adjusting rheostat 68 connected in the energizing circuit for the actuating winding 50 of device 48. This rheostat is provided with a reversible operating motor 70, the energization of which is controlled by an auxiliary set of contact members l''—72—r'', which are actuated by the quick-response device 48. Preferably, the sensitivity of these auxiliary members is much higher than that of the main members l'—56—r' of device 48 and in degree may even approach the high sensitivity of the normally-responsive device 26. Thus, in a practical installation, a sensitivity of the general order of 1% or 2% regulated-quantity deviation is found to be most satisfactory.

In one form of mounting found to be suitable, the movable member 72 of this auxiliary contact set may be carried by a resilient extension 74 of the main contact carrying arm 76. When so arranged, the earlier engagement of member 72 with one of its cooperating stationary members does not prevent such further movement of the arm as may be necessary to engage the main contact member 56 of device 48 with one or the other of its two cooperating stationary members.

In operation of the calibration-matching equipment just described, the named auxiliary set of contact members functions to so control the operation of motor 70 as to adjust the calibration-changing rheostat 68 to a position which, at all times, is comparable to that of the major calibration-changing rheostat 64. Thus, in the event that the voltage calibration of the major device 26 is raised, as by moving contact member 66 upwardly along resistor 64, a higher voltage will be maintained between conductors 52 and 54 with the result that quick-responsive device 48, energized therefrom, will bias contact member 72 upwardly into engagement with member l″, and thereby complete for motor 70 an energizing circuit which effects operation of rheostat 68 in the resistance-increasing direction.

The circuit just completed may be traced from the upper of control source conductors 20 through conductor 80, the armature 81 and the field winding 82 of motor 70, conductor 83, the contact members l″ and 72 of device 48 and conductor 84 back to the lower of control source conductors 20. Adjustment continues until the voltage supplied to winding 50 of device 48 is reduced to a value closely comparable to that supplied to winding 28 of device 26, at which time disengagement of contact members 72 and l″ is effected.

In a similar manner, in the event that calibration-adjusting rheostat 64 is adjusted in the resistance-decreasing direction to lower the calibration of device 26, the voltage appearing between conductors 52 and 54 is correspondingly reduced by action of device 26 and quick-response device 48 energized thereby moves contact member 72 downwardly into engagement with member r″, thereby completing a circuit which energizes motor 70 in a direction to similarly decrease the resistance of the calibration-adjusting rheostat 68 and thereby bring device 48 to the same calibration as is the major device 26.

This circuit may be traced from the upper of control-source conductor 20, through conductor 80, the armature and field windings 81 and 86 of motor 70, conductor 87, the contact members r″ and 72 of device 48, and conductor 84 back to the lower of control source conductor 20. Adjustment continues until the voltage supplied to winding 50 of device 48 is reduced to a value closely comparable to that supplied to winding 28 of device 26, at which time disengagement of contact members is effected.

Although I have shown and described a certain specific embodiment of my invention, I am fully aware that many modifications thereof are possible. My invention, therefore, is not to be restricted except insofar as is necessitated by the prior art and by the scope of the appended claims.

I claim as my invention:

1. In a regulating system comprising slow-response quantity-adjusting means, a contact-making device sensitive to small changes in the regulated quantity for controlling said means, calibration-adjusting means for said device, quick response quantity-adjusting means, and a second contact-making device sensitive to larger changes in the regulated quantity for controlling said quick-response means, the combination of means for matching the calibration of said second-named contact-making device with that of the one first named comprising calibration-adjusting means for the second-named device, and a second set of contact members actuated by said device in a manner to respond to small changes in the regulated quantity and adapted to control the operation of said second-named calibration-adjusting means.

2. In a regulating system comprising both slow-acting and quick-acting quantity-adjusting means, a contact-making device adapted to control the operation of said slow-acting means in response to small errors in the regulated quantity, a second contact-making device adapted to control the quick-acting means in response to larger errors, and separate calibration-adjusting means for each of said contact-making devices, the combination with the calibration-adjusting means of the large-error sensitive device of operation-control means therefor so actuated by the device as to cause the said adjusting means to follow adjustments of the small-error responsive device calibration-adjusting means.

3. In a regulating system comprising both slow-acting and quick-acting quantity-adjusting means, a contact-making device adapted to control the operation of said slow-acting means in response to small errors in the regulated quantity, a second contact-making device adapted to control the quick-acting means in response to larger errors, and separate calibration-adjusting means for each of said contact-making devices, the combination with the calibration-adjusting means of the large-error sensitive device of operation-control means therefor, including a second set of device contact members, so actuated by the device as to cause said adjusting means to follow adjustments of the small-error-responsive device calibration-adjusting means.

HOMER C. NYCUM.